(12) United States Patent
Maier et al.

(10) Patent No.: US 7,351,775 B2
(45) Date of Patent: Apr. 1, 2008

(54) ION CONDUCTIVE MEMBRANE MADE FROM A BLOCK COPOLYMER AND METHODS OF MAKING A BLOCK COPOLYMER

(75) Inventors: Gerhard Maier, München (DE);
Günther G. Scherer, Hägglingen (CH);
Chong-Kyu Shin, Unterschleissheim (DE)

(73) Assignee: General Motors Corporation, Detroit, MI (US)

( * ) Notice: Subject to any disclaimer, the term of this patent is extended or adjusted under 35 U.S.C. 154(b) by 499 days.

(21) Appl. No.: 10/768,507

(22) Filed: Jan. 30, 2004

(65) Prior Publication Data

US 2004/0186262 A1    Sep. 23, 2004

(51) Int. Cl.
*C08G 65/38* (2006.01)
(52) U.S. Cl. .................. 525/535; 528/167; 528/171; 528/391
(58) Field of Classification Search ............ 525/536; 528/171
See application file for complete search history.

(56) References Cited

U.S. PATENT DOCUMENTS

| | | | | |
|---|---|---|---|---|
| 4,380,598 | A * | 4/1983 | Robeson et al. | 524/163 |
| 5,180,750 | A * | 1/1993 | Sugaya et al. | 521/32 |
| 6,361,901 | B1 * | 3/2002 | Mayes et al. | 429/309 |
| 6,902,801 | B2 * | 6/2005 | Charnock et al. | 428/320.2 |
| 2002/0091225 | A1 * | 7/2002 | McGrath et al. | 528/170 |
| 2003/0044669 | A1 | 3/2003 | Hidaka et al. | 429/33 |
| 2004/0191602 | A1 * | 9/2004 | Ishikawa et al. | 429/33 |
| 2006/0036064 | A1 * | 2/2006 | McGrath et al. | 528/373 |

FOREIGN PATENT DOCUMENTS

| | | |
|---|---|---|
| EP | 1113517 A2 | 7/2001 |
| EP | 1274142 A2 | 1/2003 |
| EP | 1274147 | 1/2003 |
| JP | 08020704 | 1/1996 |
| WO | WO00/05774 | 2/2000 |
| WO | WO01/19896 | 3/2001 |
| WO | WO01/70858 | 9/2001 |
| WO | 02/087001 A2 | 10/2002 |

OTHER PUBLICATIONS

Ueda et al., "Synthesis and Characterization of Aromatic Poly(ether Sulfone)s Containing Pendant Sodium Sulfonate Groups, Journal of Polymer Science"; part A: Polymer Chemistry, vol. 31, 853-858 (1993).*

(Continued)

*Primary Examiner*—David J. Buttner
*Assistant Examiner*—John J. Figueroa

(57) ABSTRACT

A block copolymer for use as a solid polymer electrolyte, said block copolymer having at least first and second segments, the first segments being hydrophilic segments provided with acidic substituents for proton transport and the second segments being hydrophobic segments having substantially no acidic substituents and serving for the mechanical integrity of the solid polymer electrolyte. Also described and claimed are an ion-conductive membrane made from block copolymers of the aforementioned kind as well as methods of preparing such block copolymers and membranes based thereon. The membranes have improved proton conductivity and improved mechanical properties in the presence of water making them particularly suitable for use in fuel cells.

10 Claims, 1 Drawing Sheet

OTHER PUBLICATIONS

Wang, F. et al, "Synthesis of Sulfonated Poly(Arylene Ether Sulfones) Via Direct Polymerization", Polymer Preprints 2000, 41(1), 237-238, Mar. 2000.*

Mecham, J. et al., "Synthesis and Characterization of Controlled Molecular Weight Sulfonated Aminofunctional Poly(Arylene Ehter Sulfones) Prepared By Direct Polymerization", Polymer Preprints 2000, 41(2), 1388-1389, Aug. 2000.*

Hickner, M. et al., "Proton Exchange Membrane Nanocomposites": Proceedings of the American Society for Composites, 16th Technical Conference, M.W. Hyer and A.C. Loos, Eds., Sep. 9-12, 2001, Blacksburg, VA (IPaper No. 225).*

Wang et al. Direct Polymerization of Sulfonated Poly(Arylene Ether Sulfone) Random (Statistical) Copolymers: Candidates For New Proton Exchange Membranes, Journal of Membrane Science 197, 231-32 (2002).*

Hickner et al., Alternative Polymer Systems for Proton Exchange Membranes (PEMs), Chemical Reviews 104, 4587-4612 (2004).*

* cited by examiner

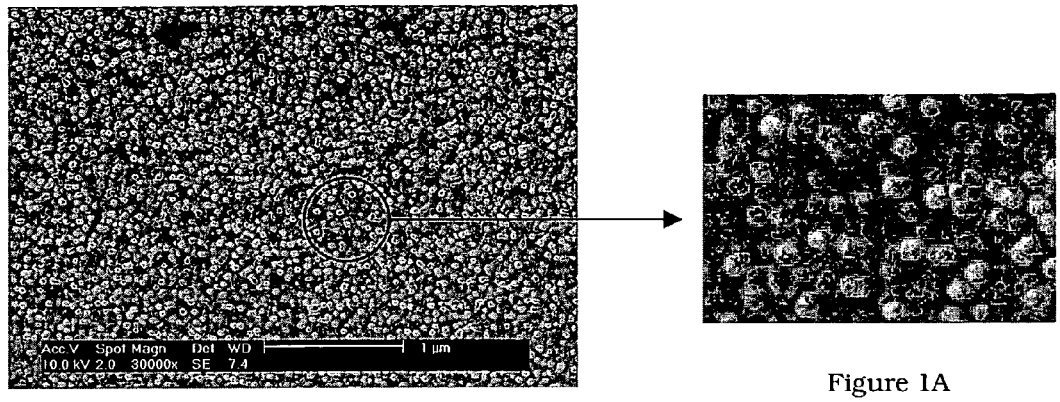
Figure 1. SEM image of the fracture surfaces of membrane.
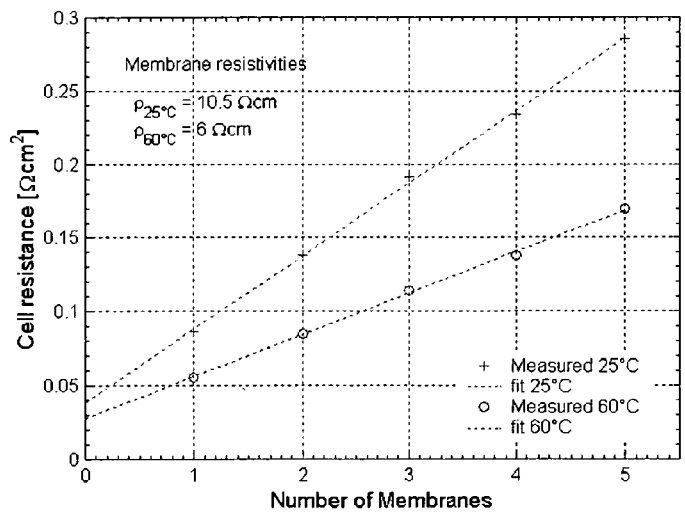
Figure 2. Resist°C and 60°C.

ION CONDUCTIVE MEMBRANE MADE FROM A BLOCK COPOLYMER AND METHODS OF MAKING A BLOCK COPOLYMER

TECHNICAL FIELD

The present invention relates to a block copolymer for use as a solid polymer electrolyte, to an ion-conductive membrane made from a block copolymer and to methods of making a block copolymer. The present invention has particular relevance to synthesizing block copolymers for use as ion exchange membranes in fuel cells.

BACKGROUND OF THE INVENTION

The Nafion membrane developed by DuPont in 1966 as a proton conductive membrane has been almost the only advanced polymer electrolyte available for use in a membrane electrode assembly in a fuel cell.

Due to the extreme requirements concerning the chemical stability of polymer electrolyte membranes used in fuel cells, only a very small number of polymer backbones are promising candidates. Aromatic polyethers are among the first choice for this application. Only a very limited number of polymer backbone types have a chance of withstanding the extremely demanding conditions a fuel cell membrane is exposed to. Hydrolysis, oxidation and reduction (hydrogenation) can lead to degradation of the polymer, reducing the lifetime of a polymer electrolyte membrane. Poly(arylene ether)s, especially poly(ether ketone)s and poly(ether sulfone)s, as well as polyarylenes such as poly(para-phenylene) are the most promising candidates for future improvements. Besides their chemical stability, these polymer classes also exhibit excellent mechanical properties in their native forms.

U.S. Pat. No. 4,625,000 describes a sulfonation procedure of poly(ether sulfone)s for solid polymer electrolytes. However, post sulfonation of preformed polymers offers little control of the position, number, and distribution of the sulfonic acid groups along the polymer backbone. Moreover, the water uptake of membranes prepared from post sulfonated polymers increases leading to large dimensional changes as well as a reduction in strength as the degree of sulfonation increases.

U.S. Pat. No. 6,090,895 provides a process for making cross linked acidic polymers of sulfonated poly(ether ketone)s, sulfonated poly(ether sulfone)s, sulfonated polystyrenes, and other acidic polymers by cross linking with a species which generates an acidic functionality. However, this reference does not suggest an effective way to cast membranes from those cross linked sulfo-pendent aromatic polyethers.

EP Patent No. 1,113, 517 A2 discloses a polymer electrolyte containing a block copolymer comprising blocks having sulfonic acid groups and blocks having no sulfonic acid groups by post sulfonation of precursor block copolymers consisting of aliphatic and aromatic blocks. In this patent, the precursor block copolymers are sulfonated using concentrated sulfuric acid, which leads to the sulfonation of aromatic blocks. However, this post sulfonation of aromatic blocks offers the little control of the position, number, and distribution of the sulfonic acid groups along the polymer backbone and this post sulfonation of precursor block copolymers also leads to the cleavage of chemical bonds of an aliphatic block.

SUMMARY OF THE INVENTION

In order to satisfy the above objects there is provided a block copolymer for use as a solid polymer electrolyte, said block copolymer having at least first and second segments, the first segments being provided with acidic substituents for proton transport and the second segments having substantially no acidic substituents and serving for the mechanical integrity of the solid polymer electrolyte. The first segments are preferably hydrophilic segments whereas the second segments are preferably hydrophobic segments.

An ion-conductive membrane having favourable properties can readily be made from such block copolymers. More specifically, in a preferred ion-conductive membrane said first segments have the general formula

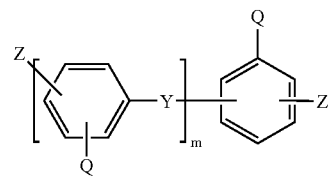

in which:
Y represents —O—, —S—, —CO—, —SO$_2$—, —C(CH$_3$)$_2$—, or —C(CF$_3$)$_2$—, diphenyl methylene, diphenyl silicon, fluorenyl or a bond directly to the next aromatic ring, end groups Z represent a halogen (F, Cl, Br, I), —NO$_2$ or —OH, Q represents —SO$_3$H, —SO$_3^-$M$^+$, —COOH, —COO$^-$M$^+$, —PO$_3$H$_2$, —PO$_3$H$^-$M$^+$, or —PO$_3^{2-}$2M$^+$ where M is a metal such as Na or K, with m being preferably between 5 and 200, with the bridges Y between sequential aromatic rings when m>1 being the same or different and being selected from any of the above atoms or groups listed for Y and with Q not having to be present in every aromatic ring.

In a preferred ion-conductive membrane said second segments have the general formula

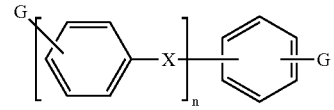

in which:
X represents —O—, —S—, —CO—, —SO$_2$—, —C(CH$_3$)$_2$—, —C(CF$_3$)$_2$ diphenyl methylene, diphenyl silicon, fluorenyl or a bond directly to the next aromatic ring, the end groups G represent a halogen (F, Cl, Br, I), —NO$_2$ or —OH, with the number of repeating units n constituting a second segment forming a hydrophobic block preferably lying in the range from 5 to 200 and with the bridges X between sequential aromatic rings being the same or different and being selected from any of the above atoms or groups listed for X.

Various methods are proposed, in accordance with the present invention, for manufacturing a block copolymer in accordance with the invention.

One method comprises the steps of:
a) synthesizing an end functionalised oligomer (block) consisting of a plurality of said second segments, said second segments having the general formula

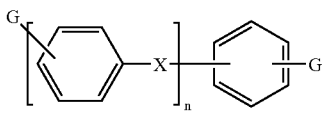

in which:

X represents —O—, —S—, —CO—, —SO$_2$—, —C(CH$_3$)$_2$—, —C(CF$_3$)$_2$—, diphenyl methylene, diphenyl silicon, fluorenyl or a bond directly to the next aromatic ring and the end groups G represent a halogen (F, Cl, Br, I), —NO$_2$ or —OH, with the number of repeating units n of an aromatic ring constituting a second segment forming a hydrophobic block preferably lying in the range from 5 to 200 and with the bridges X between sequential aromatic rings being the same or different and being selected from any of the above atoms or groups listed for X, and b) synthesis of a block copolymer by reacting the product of step a) with a monomer, or a mixture of monomers, suitable for forming said first segments, said monomer or monomers being selected from the group consisting of bisphenols, aromatic difluorides, aromatic dichlorides, aromatic dibromides, aromatic diiodides, and aromatic dinitro compounds, and any desired combinations thereof, said members of said group having an acid substituent at at least some of the phenyl rings.

Another method comprises the steps of:

a) synthesizing an end functionalised oligomer (block) consisting of a plurality of said second segments, said second segments having the general formula

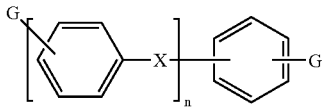

in which:

X represents —O—, —S—, —CO—, —SO$_2$—, —C(CH$_3$)$_2$—, —C(CF$_3$)$_2$— diphenyl methylene, diphenyl silicon, fluorenyl or a bond directly to the next aromatic ring and the end groups G represent a halogen (F, Cl, Br, I), NO$_2$ or —OH, with the number of repeating units n of an aromatic ring constituting a second segment forming a hydrophobic block preferably lying in the range from 5 to 200 and with the bridges X between sequential aromatic rings being the same or different and being selected from any of the above atoms or groups listed for X, b) synthesising an end-functionalised oligomer (block) consisting of a plurality of first segments having the general formula

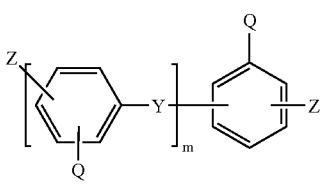

in which:

Y represents —O—, —S—, —CO—, —SO$_2$—, —C(CH$_3$)$_2$—, or —C(CF$_3$)$_2$—, diphenyl methylene, diphenyl silicon, fluorenyl or a bond directly to the next aromatic ring, Z represents a halogen (F, Cl, Br, I), —NO$_2$ or —OH, Q represents —SO$_3$H, —SO$_3^-$M$^+$, —COOH, —COO$^-$M$^+$, —PO$_3$H$_2$, —PO$_3$H$^-$M$^+$, or —PO$_3^{2-}$2M$^+$ where M is a metal such as Na or K, with m being preferably between 5 and 200, with the bridges Y between sequential aromatic rings when m>1 being the same or different and being selected from any of the above atoms or groups listed for Y, with Q not having to be present in every aromatic ring and with G and Z being selected as partners capable of a coupling reaction, and c) reacting the products of steps a) and b) to form the block copolymer.

Also in accordance with the invention a method of preparing an ion-conductive membrane from a block copolymer made in accordance with either of the above methods comprises the steps of:

a) transforming the acid groups of the block copolymer to acid halide groups, b) casting a film from a solution of the acid halide form of the block copolymer of step a) onto a substrate, and c) transforming the acid halide groups into the corresponding acid groups, whereby said membrane is formed.

The transformation into the acid halide form is preferably a transformation into an acid chloride form and is effected by the use of thionyl chloride, phosphoryl chloride or oxalyl chloride or another suitable reagent known in organic chemistry. The use of thionyl chloride is particularly expedient since it also acts as a solvent.

The invention provides, in a preferred embodiment, a method of synthesizing sulfo-pendent block copolymers comprising an alternating sequence of hydrophobic blocks substantially consisting of aromatic ethers and hydrophilic blocks having ion exchange groups, wherein the hydrophobic blocks substantially have no ion exchange groups, whereas the hydrophilic blocks have such ion exchange groups prepared by conversion of sulfonyl chloride groups to sulfonic acid groups. The hydrophilic blocks have acidic functions, preferably between a minimum of 1 acidic function per 4 phenyl rings and a maximum of 2 acidic functions per each phenyl ring. Membranes manufactured from these block copolymers have particular commercial utility in solid electrolyte fuel cells due to their high proton conductivity, resulting from the high density of the Q groups in the first hydrophilic segments and the good mechanical properties resulting from the second hydrophobic segments which alternate with the first segments.

In the membranes the long chains of the block copolymers automatically adopt positions in which the first segments of different chains tend to group together and form volumes of enhanced proton conductivity within a matrix of second segments which ensure mechanical strength and resistance to water solubility of the membrane. The grouping of the first segments tends to form a so called micro-phase separated morphology, for example with the first segments in the form of spheres, cylinders or lamellae or of ordered bi-continuous double diamond structures, which measurements have shown to be favourable for use in membranes of fuel cells. Although fuel cells, especially PEM fuel cells, rely on proton transport, the membranes of the present invention are also suitable for the conduction of other ions such as Na+ ions.

The present invention thus provides a novel and creative method of preparing preferably sulfo-pendent block copolymers fully based on hydrocarbons, as well as a process of membrane casting procedures from corresponding block copolymers comprising an alternating sequence of hydrophobic blocks and hydrophilic blocks. In the present invention, ion exchange groups are introduced into monomers and the so formed sulfonated monomers are then polymerized along with corresponding hydrophobic blocks by adaptation of an established procedure rather than by sulfonating the precursor block copolymers as in the prior art. This approach allows improved control over chemical structures of the solid electrolytes leading to improved overall performance in terms of long term stability, proton conductivity, and lower water uptake of corresponding conductive membranes. Consequently, introducing the sulfonated monomers into hydrophobic blocks allows full control of the position, number, and distribution of the ion exchange groups along the polymer backbone. Ion conductive membranes from sulfo-pendent block copolymers provide cylinders of the hydrophilic segments embedded in the hydrophobic matrix by rearrangements of hydrophobic blocks, which leads to higher proton conductivity.

Preferred embodiments of the invention will be described by way of example in the following and are also to be found in the subordinate claims.

BRIEF DESCRIPTION OF THE DRAWINGS

FIG. 1 shows an SEM image of the fracture surfaces of an ion conductive membrane made in accordance with the invention;

FIG. 1A (with the arrowed image) is a section of FIG. 1 to an enlarged scale; and FIG. 2 shows the result of resistance measurements carried out on a specific membrane at 25° C. and at 60°.

DESCRIPTION OF THE PREFERRED EMBODIMENT

The present description relates to a novel route for preparing ion conductive membranes fully based on hydrocarbons without any further sulfonation procedures of precursor polymers and without any further cross linking procedures of corresponding sulfonated polymers. A novel method of synthesizing block copolymers comprising an alternating sequence of hydrophobic blocks substantially consisting of aromatic ethers and hydrophilic blocks having ion exchange groups is disclosed, wherein hydrophobic blocks substantially have no ion exchange groups, but hydrophilic blocks have ion exchange groups prepared by conversion of sulfonyl chloride groups to sulfonic acid groups. Hydrophilic blocks having an acidic functionality are substantially comprised of aromatic ethers, wherein at least some aromatic rings have one ion exchange group each and some can have more than one ion exchange group.

In the present description, the term sulfo-pendent block copolymer means a polymer in which an alternating sequence of hydrophobic blocks and hydrophilic blocks are directly chemically bonded.

In the best mode of the present invention block copolymers are prepared in a two stage process. The first stage of the process is preferably used to prepare the precursors, that is, end-functionalized hydrophobic blocks with the desired length by imbalancing the chemical equivalence of monomers constituting hydrophobic blocks having a repeating unit represented by the general formula [1].

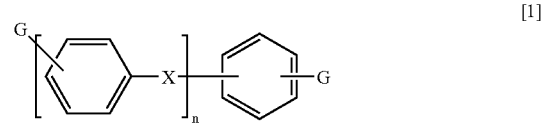

[1]

In the formula [1],

X represents —O—, —S—, —CO—, —SO$_2$—, —C(CH$_3$)$_2$—, —C(CF$_3$)$_2$—, diphenyl methylene, diphenyl silicon, fluorenyl or a bond directly to the next aromatic ring and the end groups G represent a halogen (F, Cl, Br, I), —NO$_2$ or —OH, with the number of repeating units n of an aromatic ring constituting a second segment forming a hydrophobic block preferably lying in the range from 5 to 200 and with the bridges X between sequential aromatic rings being the same or different and being selected from any of the above atoms or groups listed for X.

An example of the end-functionalized hydrophobic blocks represented by the general formula [1] constituting sulfo-pendent block copolymers may be obtained, for example, by the condensation of 4,4'-difluorobenzophenone with 2,2-Bis-(4-hydroxyphenyl)-propane at desired stoichiometry in the presence of potassium carbonate in order to adjust the length of the hydrophobic blocks, which lead to an end-functionalized hydrophobic block oligomer, e.g. as represented by the general formula [2], wherein the alkyl groups of 2,2-Bis-(4-hydroxyphenyl)-propane may support the solubility of a hydrophobic block oligomer when it is employed for continuous condensation to introduce the sulfonated monomers into hydrophobic block oligomers.

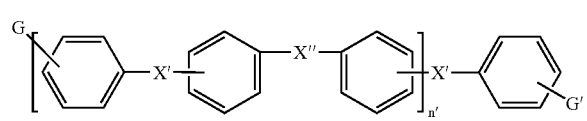

[2]

In the formula [2], the end groups G' are preferably —OH, or —F rather than —Cl, —Br, —I, X' is preferably —CO—, or —SO$_2$— when X" is the combination of —O—, and —C(CH$_3$)$_2$—. On the other hand, X' is preferably —C(CH$_3$)$_2$— when X" is the combination of —O—, —CO—, and —SO$_2$— in the formula [2], and n' is preferably from 2 to 200.

The second stage of the process is preferably carried out to add the monomers having an acidic functionality, which are substantially comprised of aromatic rings of the general formula [3], in which one aromatic ring has one ion exchange group, to the end-functionalized hydrophobic blocks at desired stoichiometry in order to adjust the length of hydrophilic blocks and to continue the condensation to prepare the corresponding block copolymers.

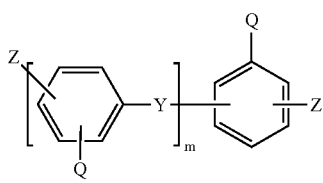

[3]

In the formula [3],
Y represents —O—, —S—, —CO—, —SO$_2$—, —C(CH$_3$)$_2$—, or —C(CF$_3$)$_2$—, diphenyl methylene, diphenyl silicon, fluorenyl or a bond directly to the next aromatic ring, the end groups Z represent a halogen (F, Cl, Br, I), —NO$_2$ or —OH, Q represents —SO$_3$H, —SO$_3$$^-$M$^+$, —COOH, —COO$^-$M$^+$, PO$_3$H$_2$, —PO$_3$H$^-$M$^+$, or —PO$_3$$^{2-}$2M$^+$ where M is a metal such as Na or K, with m being preferably between 5 and 200, with the bridges Y between sequential aromatic rings when m>1 being the same or different and being selected from any of the above atoms or groups listed for Y, with Q not having to be present in every aromatic ring and with G and Z being selected as partners capable of a coupling reaction Among sulfonated monomers, preferred monomers include hydroquinone 2-potassium sulfonate (available from Aldrich Chemical Co.), potassium 5,5'-carbonylbis(2-fluoro benzene sulfonate), potassium 5,5'-sulfonylbis(2-fluorobenzene sulfonate), and the like.

Potassium 5,5'-carbonylbis(2-fluorobenzene sulfonate), as an example of the general formula [4] may be prepared by sulfonation of 4,4'-difluorobenzophenone with fuming sulfuric acid and 5,5'-sulfonylbis(2-fluorobenzene sulfonate) may be prepared by sulfonation of 4,4'-difluorodipehnyl sulfone with fuming sulfuric acid.

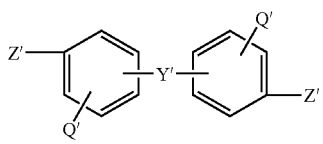

[4]

In the formula [4],
Y' is preferably —CO—, or —SO$_2$— due to its higher electron withdrawing property leading to an increase in the overall reaction activity of condensation, Z' is preferably —F or —NO$_2$ rather than —Cl, —Br—, or —I, and Q' is preferably —SO$_2$Na, or —SO$_3$K, rather than —COONa, —COOK due to its higher acidity.

Finally, each block copolymer consists of an alternating sequence of several hydrophobic and hydrophilic blocks.

Casting an ion conductive membrane directly from a solution having sulfo-pendent block copolymers comprising an alternating sequence of hydrophobic blocks and hydrophilic blocks with the form of sulfonic acid may be impossible. Apparently, there is no common organic solvent for both types of blocks which will allow a membrane for a solid polymer fuel cell to be cast. To overcome this difficulty it is proposed, in accordance with the present teaching, to convert the sulfonic acid into acid chloride groups by any appropriate method, including reaction with thionyl chloride. Resulting block copolymers having the thionyl chloride groups converted from acid groups can be dissolved in a organic solvent such as tetrahydrofurane (THF), N,N-dimethylformamide (DMF), N,N-dimethylacetamide (DMAc), dimethylsulfoxide (DMSO), N-methyl-2-pyrrolidone (NMP) and the like, which allows corresponding block copolymers to be cast onto a glass plate, and dried slowly at an elevated temperature and finally in vacuum. During the drying process, a micro phase separation between the hydrophobic blocks and the hydrophilic blocks may be expected. Ideally, the hydrophilic phase will form cylinders embedded in the hydrophobic matrix. The phase separation may be critical for the concept of the block copolymer membranes, as it may create a morphology comparable to that observed in Nafion membranes.

The sulfonyl chloride in the membrane prepared may be converted into —SO$_3$Na or —SO$_3$K when they are immersed into aqueous NaOH or KOH solution to regenerate the salt form. Further, if they are treated with an aqueous acidic solution such as sulfuric acid, hydrochloric acid, or nitric acid, then the salt form may be converted into an acid, that is, —SO$_3$H of the sulfonyl groups. The conversion of sulfonyl chloride to sulfonic acid groups and the corresponding hydrolysis procedure is preferably carried out at a temperature from 20 to 120° C.

In the present invention, the final form of membranes typically results in insolubility of the membrane in water and methanol under all conditions.

Experimental Procedures

In the experiments which will subsequently be described with reference to examples the chemicals used are commercially available through Aldrich Chemical Co., or Fluka Chemical Co. unless otherwise noted.

The membrane conductivity in the H$^+$-form was recorded at room temperature by ac impedance measurements using a frequency response analyzer (Solartron 1250) in combination with an electrochemical interface (Solartron 1186). The membrane conductance was determined by extrapolating the high frequency end of a Nyquist plot to the real axis. The extrapolation was performed by a linear regression. For an evaluation of cell and contact resistances, measurements with a variable number (n=1-4) of membrane discs were carried out and the sum of cell and contact resistance evaluated by extrapolation to n=0. The specific conductivity was calculated from the average resistance and from their dimensions. The temperature dependence of specific conductivity was also determined in the temperature range between room temperature and 80° C.

Water uptake was measured as follows. Membranes were swollen in distilled water at the desired temperature, e.g. 80° C.—a typical operating temperature for a PEM fuel cell— for 1 day, cooled down to room temperature and then removed from the water. Surface attached water was quickly removed with tissue paper and the weight of the wet membrane was determined. The membrane was then dried to constant weight in a vacuum oven at 120° C. and the dry weight of membrane determined. Water uptake is calculated by the difference between the wet and dry weights divided by the dry weight, which is reported as a percentage.

The ion-exchange capacity (IEC, mequiv of SO$_3$H/g) measured here is based on the following procedures. Membrane (preferably 0.5 g-1.0 g) was immersed into 50 ml of saturated NaCl solution and the mixture was stirred for 1 day to allow the H$^+$ ions to exchange with Na$^+$ ions. The released H$^+$ ions were titrated with 0.1 N NaOH. From consumed NaOH, the ion-exchange capacity of the membrane was calculated via the following formula:

IEC=consumed ml NaOH×molarity NaOH/weight dried membrane [meq/g]

EXAMPLES OF CHEMICAL PREPARATION OF RELEVANT CHEMICALS

Example 1

Preparation of a Preferred Monomer in the form of Potassium 5,5'-carbonylbis(2-fluorobenzene sulfonate)

4,4'-difluorobenzophenone (10.9 g, 50 mmol) was dissolved in 20 ml fuming sulfuric acid (~30% $SO_3$). The solution was stirred at 100° C. for 16 hours, then cooled to room temperature and poured into 120 ml of ice water. KOH (28 g) was added to neutralize the excess fuming sulfuric acid. The mixture was cooled again and the addition of KCl (25.5 g) resulted in the precipitation of a white solid, which was filtered off and dried. Re-crystallization from distilled water yielded a white solid. In order to completely remove the other inorganic salts, the white solid was re-crystallized using distilled water once more. The yield was 16.18 g (71%). The compound was clearly characterized using FT-IR and $^1$H-NMR.

Example 2

Preparation of Hydrophobic Blocks

A series of the end-functionalized hydrophobic blocks represented by the general formula [1] constituting sulfopendent block copolymers were prepared in the following manner:

1,3-Bis(4-fluorobenzoyl)benzene (3.546 g, 0.011 mol) was reacted with 2,2-Bis-(4-hydroxyphenyl)-propane at desired stoichiometry (>0.011 mol) in the presence of potassium carbonate (3.075 g, 0.022 mol), in order to adjust the number average molar mass of the resulting hydrophobic block from 4000 to 12000 (g/mol) with an interval of 2000 (g/mol), under a dry nitrogen atmosphere in a round bottom flask equipped with nitrogen inlet and a Dean-Stark trap using NMP (15 ml) and toluene. After brisk refluxing/recycling of toluene at 150° C. for 4 hours, a creamy suspension was obtained. Further toluene (15 ml) was added and the refluxing was continued. The azeotrope in the Dean-Stark trap was drawn off, traces of toluene were removed by distillation at 182° C. under a stream of nitrogen and a yellow-colored slurry was obtained in the polymerization flask. The mixture was cooled and further NMP (45 ml) was added to the reaction mixture, which was heated at 182° C. for 6 hours. The mixture turned slightly green. The temperature was slowly raised to 210° C. and about 30 ml NMP was distilled off under a brisk nitrogen flow. The nitrogen acts as an inert gas and precludes the entry of oxygen. The concentrated polymerization mixture was maintained at 182° C. for 2 to 3 hours. A dark, homogeneous solution was obtained. The viscous solution was poured into a large excess of MeOH in order to obtain an off-white polymer. This was washed with MeOH, filtered and dried. The yield was higher than 90% in each reaction. Table 1 shows the results.

TABLE 1

Molar mass of hydrophobic block oligomers. (GPC vs PMMA calibration)

| | Oligomer 1 | Oligomer 2 | Oligomer 3 | Oligomer 4 |
|---|---|---|---|---|
| Adjusted molar mass hydrophobic block (Mn, g/mol) | 4000 | 6000 | 8000 | 10000 |
| Measured molar mass of hydrophobic block (Mn, g/mol) | 4200 | 6100 | 7900 | 9900 |

Example 3

Preparation of Sulfonated Block Copolymers

The sulfonic salt form of block copolymers was prepared by combining end-functionalized hydrophobic oligomers (prepared in Example 2) and potassium 5,5'-carbonylbis(2-fluorobenzene sulfonate) as prepared in Example 1, hydroquinone 2-potassium sulfonate (commercially available through Aldrich Chemical Co.) at balanced stoichiomery of the functional groups using the same technique described in Example 2. However, DMSO was used as reaction solvent instead of NMP due to the poor solubility of the monomers. Also, desired sulfonated block copolymers having a different IEC value were prepared by varying the stoichiometry of the functional groups. The yield was higher than 92% in each reaction.

Example 4

Preparation of Sulfonyl Chloride form of Block Copolymers 6.0 g of sulfonic salt form of block copolymer (as prepared in Example 3) and 60 ml of thionyl chloride were charged into a 100 ml round bottom flask. The mixture was refluxed for 8 hours, which led to formation of a viscous and homogeneous solution. Then, the mixture was poured into 500 ml of a stirred mixture of ice and water. A white precipitate was formed and the precipitate was washed with a large amount of water until the washings were pH-neutral. The corresponding sulfonyl chloride form of block copolymers was then washed with methanol and dried at 80° C. in vacuum for 24 hours. The yield of the sulfonyl chloride form was 4.9 g (82%).

Example 5

Membrane Preparation from Sulfonyl Chloride Form of Block Copolymers 10.0 g of the sulfonyl chloride form of block copolymer was dissolved in 80 ml of N,N-dimethylformamide (DMF) and the solution was subjected to filtration through 0.45 μm filter. Then the solvent was removed slowly under vacuum at an elevated temperature until the percentage by weight of polymer in solution became 30 (% w/V). The viscous solution was cooled and then poured onto a flat glass plate followed by adjusting the thickness of the cast film by means of a doctor blade and dried first at 60° C. in a vacuum oven for 2 hours, then the oven temperature was increased slowly to 120° C. and kept for 6 hours, and finally the vacuum was employed for 30 minutes. The membrane formed was then peeled from the glass substrate and immersed in distilled water.

During the drying process, a micro phase separation between the hydrophobic blocks and the hydrophilic blocks is expected. Ideally, the hydrophilic phase will form cylinders embedded in the hydrophobic matrix. The phase separation, which appears critical for the concept of the block copolymer membranes, was demonstrated by a scanning electron microscopy (SEM) image of the fracture surfaces of membrane. The result is shown in FIG. 1. The dark circular domains surrounded by light gray domains are understood to be cylinders of the hydrophilic segments embedded in the hydrophobic matrix. The calculated length of the repeating hydrophobic moiety in the polymer backbone, on the assumption that poly backbones are fully extended, corresponds to 0.034 μm and the length of the hydrophilic segment is 0.015 μm. Based on the composition, one expects cylinders of the hydrophilic segments. The maximum diameter of one individual cylinder should be the length of the hydrophilic segment, which agrees with that of the average circular domain, i.e. 0.010 μm, in FIG. 1.

Example 6

Regeneration of Sulfonic Acid Groups

Membranes having the sulfonyl chloride form were hydrolyzed in 1.0 N sodium hydroxide aqueous solution for 12 hours at 60° C. and then the membranes were exchanged twice in 1.0 N hydrochloric acid for 6 hours at room temperature. Finally membranes were exchanged in DI water several times. The results are summarized in Table 2.

TABLE 2

Summary of the results.

| | Membrane 1 | Membrane 2 | Membrane 3 | Membrane 4 | Membrane 5 |
|---|---|---|---|---|---|
| Molar mass of hydrophobic block (Mn, g/mol) | 4200 | 6100 | 6100 | 7900 | 9900 |
| IEC (mequiv of SO$_3$H/g) | 1.63 | 1.33 | 1.86 | 0.88 | 0.71 |
| Water uptake (80° C., %) | 40 | 23 | 59 | 12 | 11 |
| Proton conductivity (25° C., S/cm) | 5.7 × 10$^{-2}$ | 4.2 × 10$^{-2}$ | 9.5 × 10$^{-2}$ | 2.3 × 10$^{-2}$ | 0.9 × 10$^{-2}$ |
| Elongation at break (%) | 6 | 28 | 6 | 15 | 36 |

FIG. 2 shows the resistance measurements of membrane 3 as an example at 25° C. and 60° C., which includes the calculated membrane resistivities obtained by linear regression of the experimental data at both temperatures.

From the above-mentioned results, the present invention allows the improved control over chemical structures of the solid electrolytes leading to improved proton conductivity, and lower water uptake when compared with conventional polymer electrolytes into which sulfonic acid groups are randomly introduced. Consequently, introducing the sulfonated monomers into hydrophobic blocks permits full control of the position, number, and distribution of the ion exchange groups along the polymer backbone and the ion conductive membranes formed from the above block copolymers provided cylinders embedded in a hydrophobic matrix, which leads to higher proton conductivity.

The invention claimed is:

1. A product comprising: a block copolymer for use as a solid polymer electrolyte, said block copolymer having at least first and second segments, the first segments being provided with acidic substituents for proton transport and the second segments having substantially no acidic substituents and serving for the mechanical integrity of the solid polymer electrolyte, and wherein said first segments have the general formula

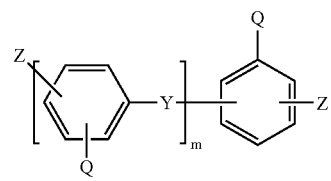

in which:

Y represents —SO$_2$—, end groups Z represent a halogen (F, Cl, Br, I),

Q represents —SO$_3$H, —SO$_3^-$M$^+$, —COOH, —COO$^-$M$^+$, —PO$_3$H$_2$, —PO$_3$H$^-$M$^+$, or —PO$_3^{2-}$2M$^+$ where M is a metal such as Na or K, with m being between 5 and 200, with the bridges Y between sequential aromatic rings being the same or different and being selected from any of the above atoms or groups listed for Y, and with Q not having to be present in every aromatic ring.

2. A product as set forth in claim 1, wherein said first segments are hydrophilic segments and said second segments are hydrophobic segments.

3. A product as set forth in claim 1, wherein said second segments have the general formula

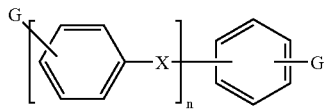

in which:
X represents —SO$_2$—,
end groups G represents a halogen (F, Cl, Br, I),
with the number of repeating units n of an aromatic ring constituting a second segment forming a hydrophobic block in the range from 5 to 200, and
with the bridges X between sequential aromatic rings being the same or different and being selected from any of the above atoms or groups listed for X.

4. A product as set forth in claim 1, wherein at least one additional segment is present of the same general composition as the aforesaid first segments, but with different atoms or groups Y or Q and with the atoms or groups Y being in any desired rational sequence.

5. A product as set forth in claims 3, wherein at least one additional segment is present of the same general composition as the aforesaid second segments, but with different atoms or groups X and with the atoms or groups X being in any desired rational sequence.

6. A product as set forth in claim 3 wherein the membrane has a micro-phase separated morphology, for example in the form of spheres, cylinders or lamellae, or of ordered bi-continuous double diamond structures.

7. A product as set forth in claim 3 wherein the second segments have a molar mass from $5 \times 10^2$ to $5 \times 10^5$ (g/mol).

8. A product as set forth in claim 1, wherein said second segments are hydrophobic blocks substantially consisting of a main chain of aromatic rings or aromatic rings and bridging groups having no sulfonic acid groups in said main chain.

9. A product comprising: a block copolymer for use as a solid polymer electrolyte, said block copolymer having at least first and second segments, the first segments being provided with acidic substituents for proton transport and the second segments having substantially no acidic substituents and serving for the mechanical integrity of the solid polymer electrolyte, and wherein said second segments have the general formula

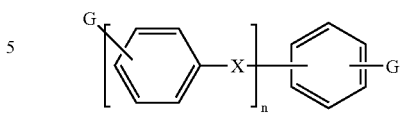

in which:
X represents —SO$_2$—,
end groups G represents a halogen (F,Cl, Br, I),
with the number of repeating units n of an aromatic ring constituting a second segment forming a hydrophobic block in the range from 5 to 200, and
with the bridges X between sequential aromatic rings being the same or different and being selected from any of the above atoms or groups listed for X.

10. A product as set forth in claim 9, wherein said first segments have the general formula

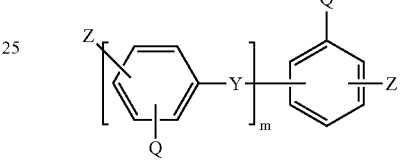

in which:
Y represents —SO$_2$—,
end groups Z represents a halogen (F, Cl, Br, I),
Q represents —SO$_3$H, —SO$_3^-$M$^+$, —COOH, —COO$^-$M$^+$, —PO$_3$H$_2$, —PO$_3$H$^-$M$^+$, or —PO$_3^{2-}$2M$^+$ where M is a metal such as Na or K,
with m being between 5 and 200,
with the bridges Y between sequential aromatic rings being the same or different and being selected from any of the above atoms or groups listed for Y, and
with Q not having to be present in every aromatic ring.

* * * * *